3 Sheets—Sheet 2.

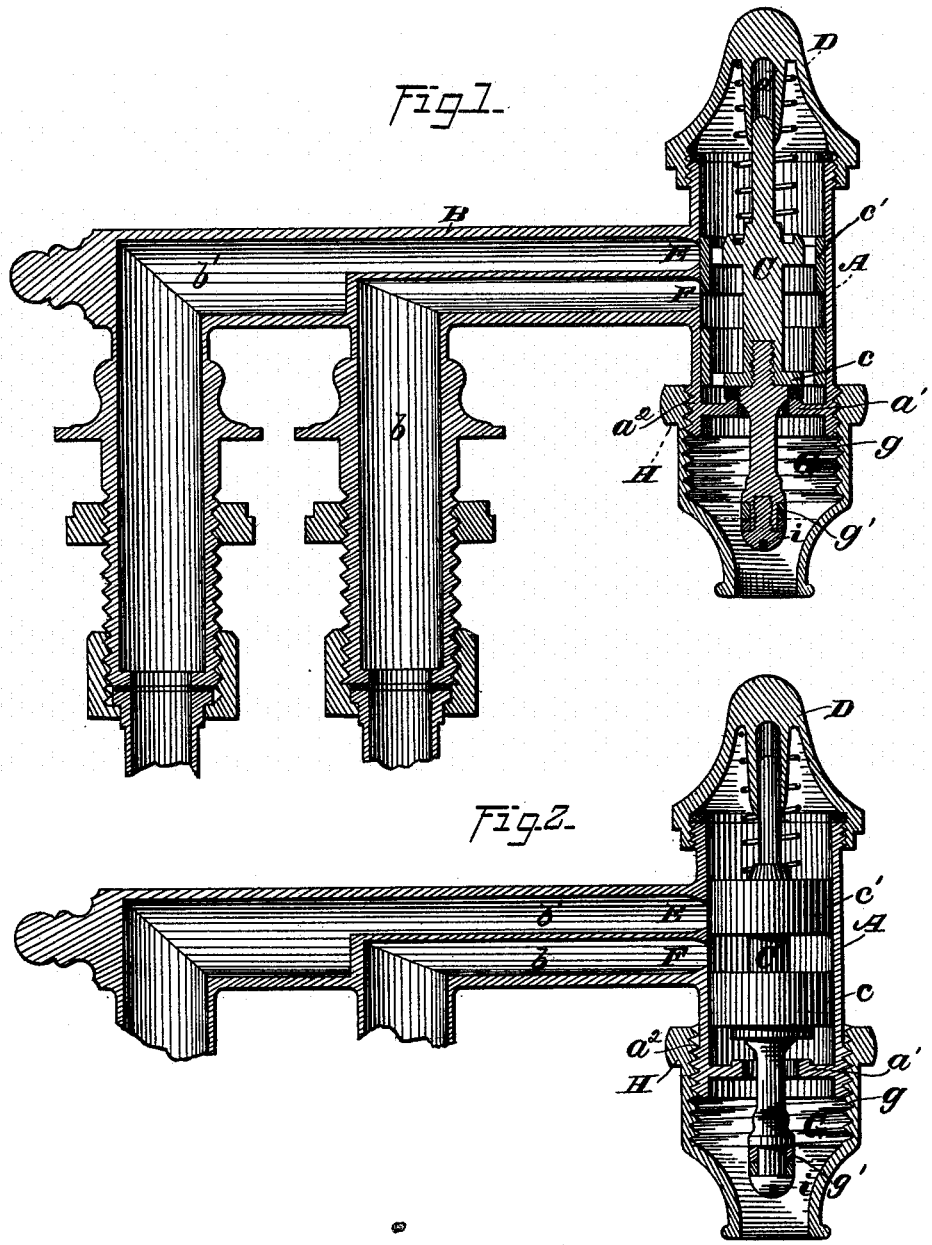

C. A BLESSING.
Cock or Faucet.

No. 221,507. Patented Nov. 11, 1879.

WITNESSES=
Jas. E. Hutchinson.
J. A. Rutherford.

INVENTOR-
Chas. A. Blessing,
by James L. Norris.
Attorney.

C. A BLESSING.
Cock or Faucet.
No. 221,507. Patented Nov. 11, 1879.
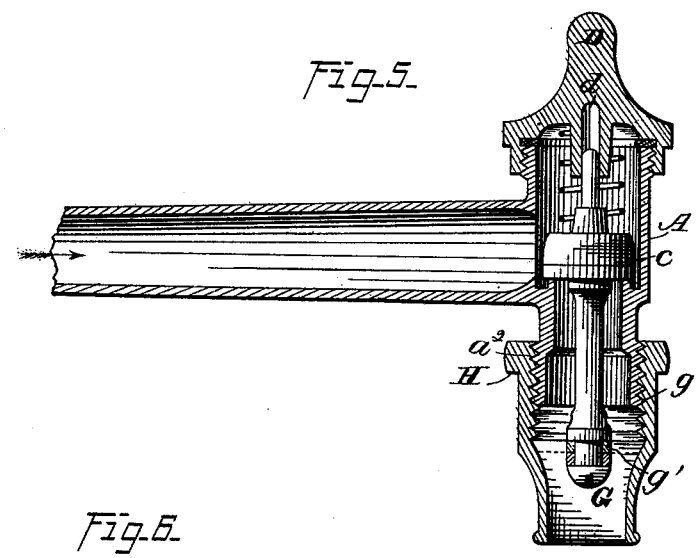
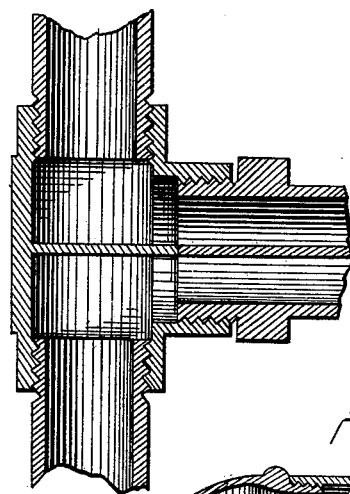
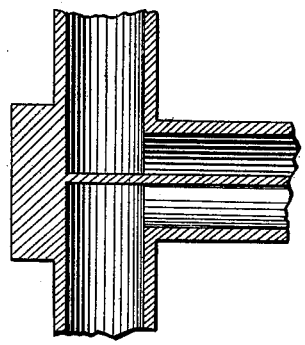
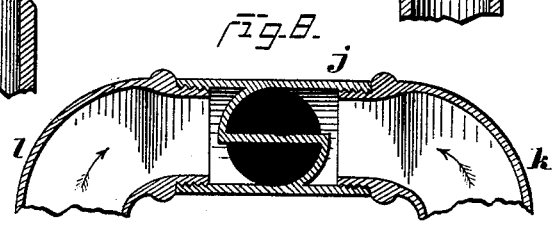
WITNESSES:
Jas. E. Hutchinson
J. A. Rutherford
INVENTOR
Chas. A. Blessing
by James L. Norris.
Attorney

UNITED STATES PATENT OFFICE.

CHARLES A. BLESSING, OF PHILADELPHIA, PENNSYLVANIA.

IMPROVEMENT IN COCKS OR FAUCETS.

Specification forming part of Letters Patent No. 221,507, dated November 11, 1879; application filed October 1, 1879.

*To all whom it may concern:*

Be it known that I, CHARLES A. BLESSING, of Philadelphia, in the county of Philadelphia and State of Pennsylvania, have invented certain new and useful Improvements in Cocks or Faucets, of which the following is a specification.

This invention relates to certain improvements in cocks or faucets for bath-tubs, stationary wash-basins, or sinks, &c.; and it has for its object to provide a simple, cheap, and effective means for operating the valves of the same, being particularly designed to be used in connection with that class of cocks or faucets for drawing off hot and cold water together, or either alone, although it is equally applicable to valves for withdrawing a single liquid.

To this end the invention consists in the combination, with a suitable valve-casing containing the valve or valves, of a nozzle provided with a female screw-thread and adapted to ride upon a male screw-thread on the lower end of the valve-casing, the said nozzle being connected with the valve-stem, whereby a longitudinal movement may be transmitted to the valves in order to shift the same, as more fully hereinafter specified.

Figure 3:
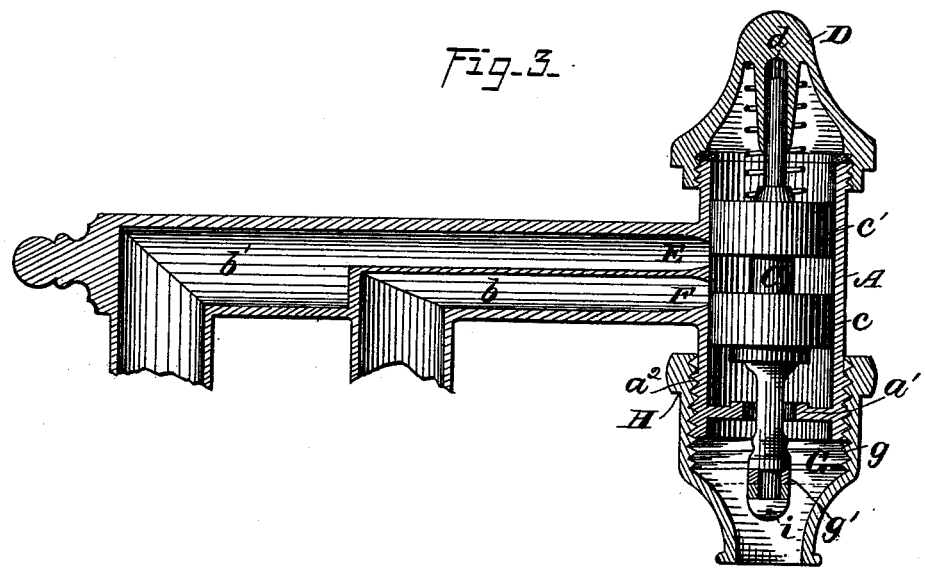

In the drawings, Figure 1 represents a vertical section, showing a cock or faucet for drawing off hot and cold water, both of the valves being in a closed position. Fig. 2 represents a similar view of the cock or faucet with the cold-water valve open. Fig. 3 represents a similar view, showing both valves open, and Fig. 4, a similar view, showing the hot-water valve open. Fig. 5 represents a modification, showing my improvement applied to a cock or faucet for drawing off a single liquid; and Figs. 6, 7, and 8 represent modifications of the water-supply connections employed with the combined hot and cold water faucets.

The letter A indicates the valve-casing, which is of cylindrical or any other convenient shape, with a lateral extension, B, in which the passage or passages for the water are formed, the letter $b$ indicating the cold-water passage, and $b'$ the hot-water passage, entering the valve-casing at different elevations.

The letter C indicates a vertical valve-stem, adapted to move in a guide-recess, $d$, in the cap D of the valve-casing, and carrying one or more valves, $c\ c'$.

The letter $a'$, Fig. 1, indicates an annular seat at the lower part of the valve-chamber, upon which the disk of the valve $c$ is seated to stop the flow of water through the casing.

The valve $c'$ is a piston-valve, and the tubular portions of the valve $c$ and the said valve $c'$ are adapted to control the ports E and F, leading from the passages $b\ b'$ to the valve-casing.

The letter G indicates a movable nozzle having a female screw-thread, $g$, adapted to engage a male screw-thread, $a^2$, on the lower end of the casing A in such manner as to ride freely up and down thereon as the nozzle is rotated. Said nozzle is provided with an internal cross-bar, $g'$, to which the lower end of the valve-rod is attached loosely, so that the nozzle may be turned thereon, but at the same time will carry the valve-rod up and down with it in its vertical movement, in order to shift the valve, the screw and washer $i$ serving to limit the downward adjustment of the screw-nozzle and to draw the lower valve-disk down on its seat. The nozzle on the outside is provided with a milled or corrugated rim or flange, H, by which it may be grasped for the purpose of turning it.

The passages $b\ b'$ may be provided with screw-couplings, as shown in Figs. 1, 6, and 8, as it may be required for bath-tubs, sinks, wash-stands, &c., for connection with iron supply-pipes, or with the ordinary plain connections, as shown in Fig. 7, to be attached by solder to lead pipes in the ordinary manner.

In the modification shown in Fig. 8 the central horizontal portion, $j$, into which the right and left hand bends $k\ l$ are screwed, is screwed onto the rear end of the shank or extension B of the casing of the cock, and is provided with the partition separating the hot and cold water supplies. To the lower ends of the two bends $k\ l$ are attached the connecting-couplings shown in Fig. 1.

In the modification shown in Fig. 5 a single valve is employed on the valve-stem, which is operated by the screw-nozzle, in the manner above described, for drawing off cold or hot water alone.

Figure 4:
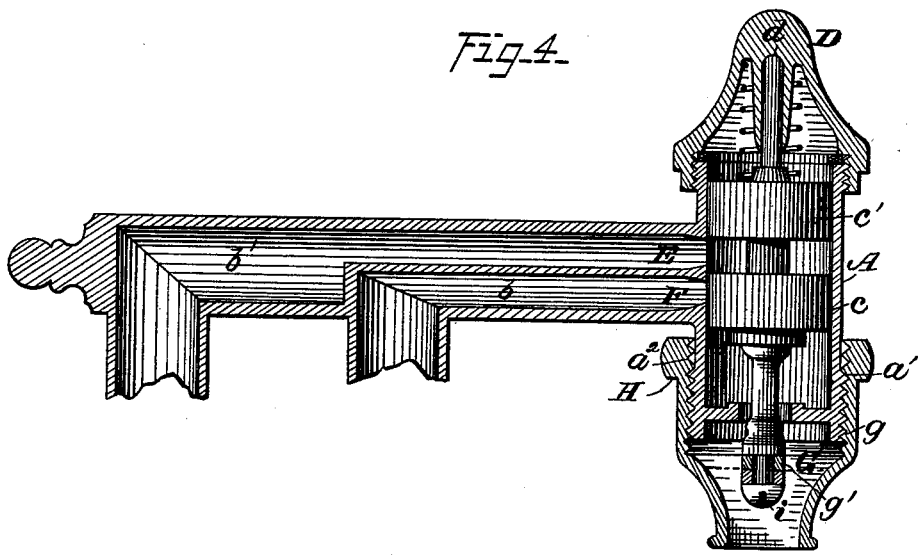

The operation of my invention is as follows:

When it is desired to draw off cold water alone, the nozzle is elevated by turning it such a distance as to clear the valve-seat $a'$, but not to cover the port F, as seen in Fig. 2. When it is desired to draw mixed cold and hot water, the nozzle is farther elevated, so as to open the port E without closing the port F, as seen in Fig. 3; and to draw off hot water alone, as shown in Fig. 4, the nozzle is still farther elevated, so as to close the port F and leave the port E open. By means of this screw-nozzle working on the lower end of the valve-casing a gradual movement is given to the valves, and a positive adjustment of said valves is secured, obviating the necessity of holding the valves in position, and, moreover, the concussion of the water in the pipes is avoided, and the mixed water can be drawn at any desired temperature—an advantage desirable over ordinary cocks.

I have shown and described in a separate application of even date with the present a cock having a shank provided with two passages, controlled by separate valves moving in a casing connected with said shank, and operated by suitable mechanism to permit either of said passages to be opened as desired; and I do not here claim this construction.

What I claim is—

1. The combination, with the casing of a cock or faucet, of an adjustable screw-threaded nozzle fitting and adapted to ride upon the lower end of the screw-threaded casing, the nozzle being connected with the valve-stem carrying a valve for operating the same, substantially as described.

2. The combination, with the valve-casing provided with ports for cold and hot water, of the valves mounted on a single valve-stem, and the same connected with a vertically-adjustable screw-nozzle secured to the lower end of the screw-threaded valve-casing, whereby the valves may be gradually and successively opened and closed, substantially as specified.

In testimony that I claim the foregoing I have hereunto set my hand in the presence of the subscribing witnesses.

C. A. BLESSING.

Witnesses:
JAMES L. NORRIS,
ALBERT H. NORRIS.